Nov. 6, 1956  L. ADAMS  2,769,570
BOX UNSTACKER
Filed June 13, 1952  7 Sheets-Sheet 1

INVENTOR.
LOYD ADAMS
BY
Lyon & Lyon
ATTORNEYS

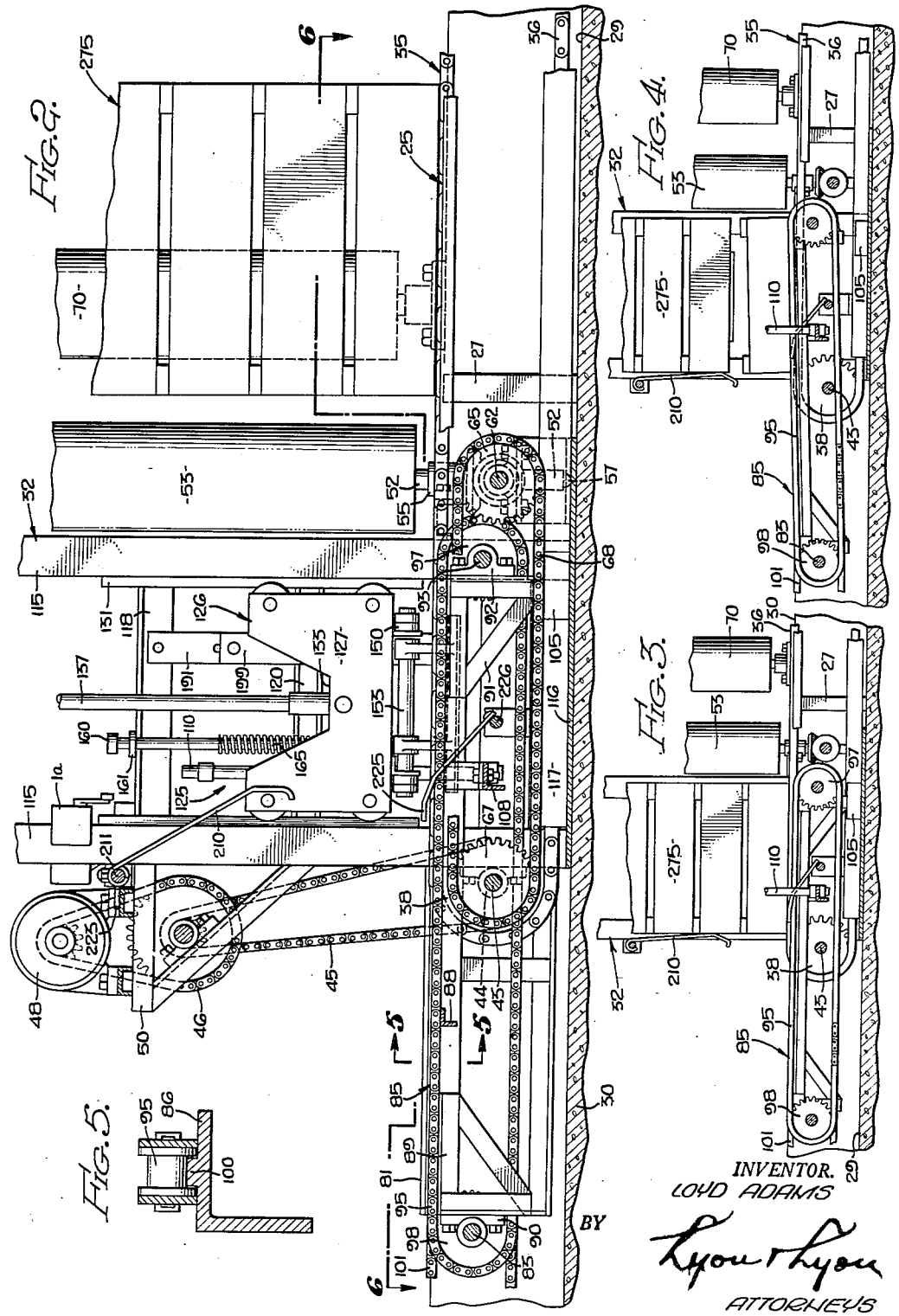

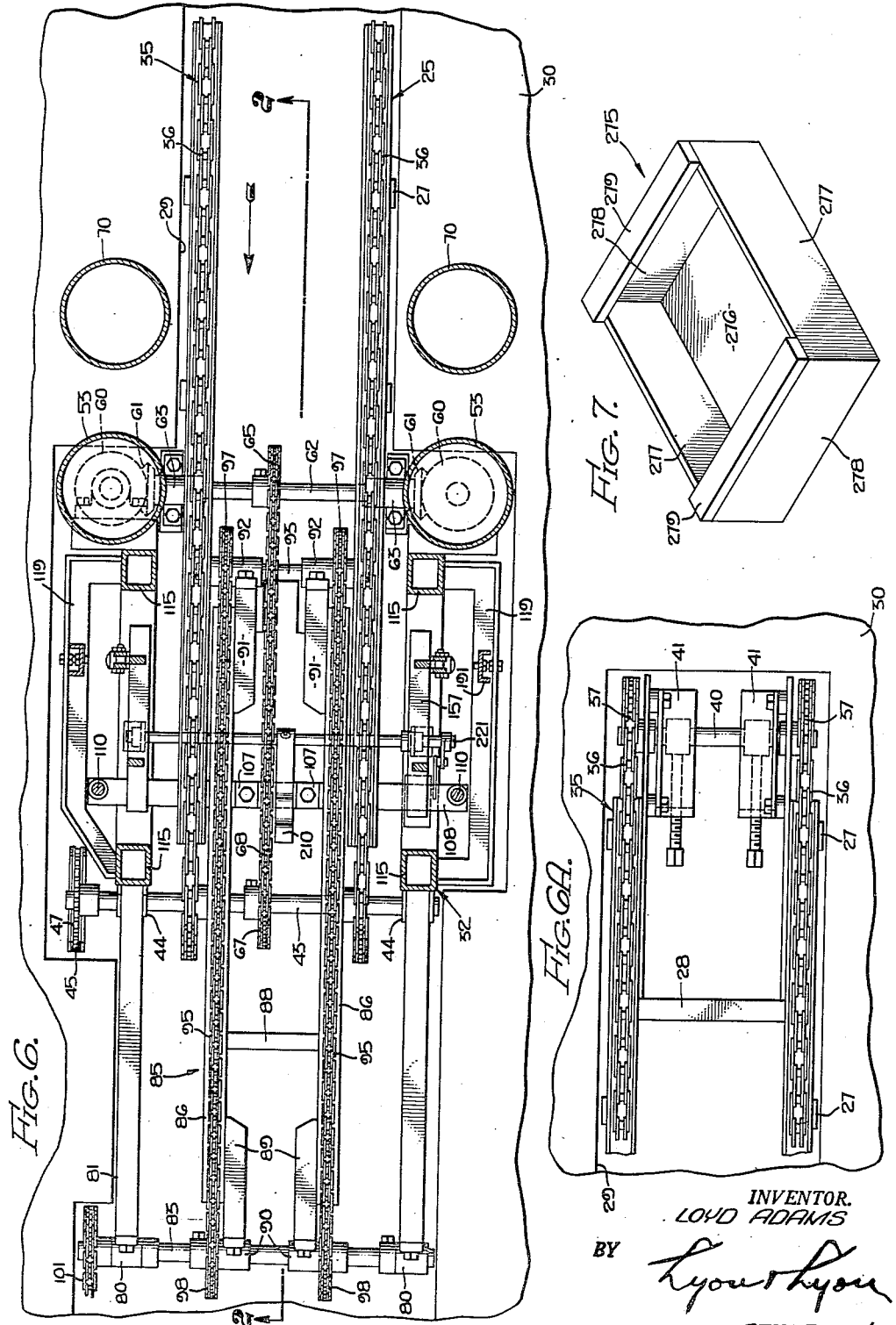

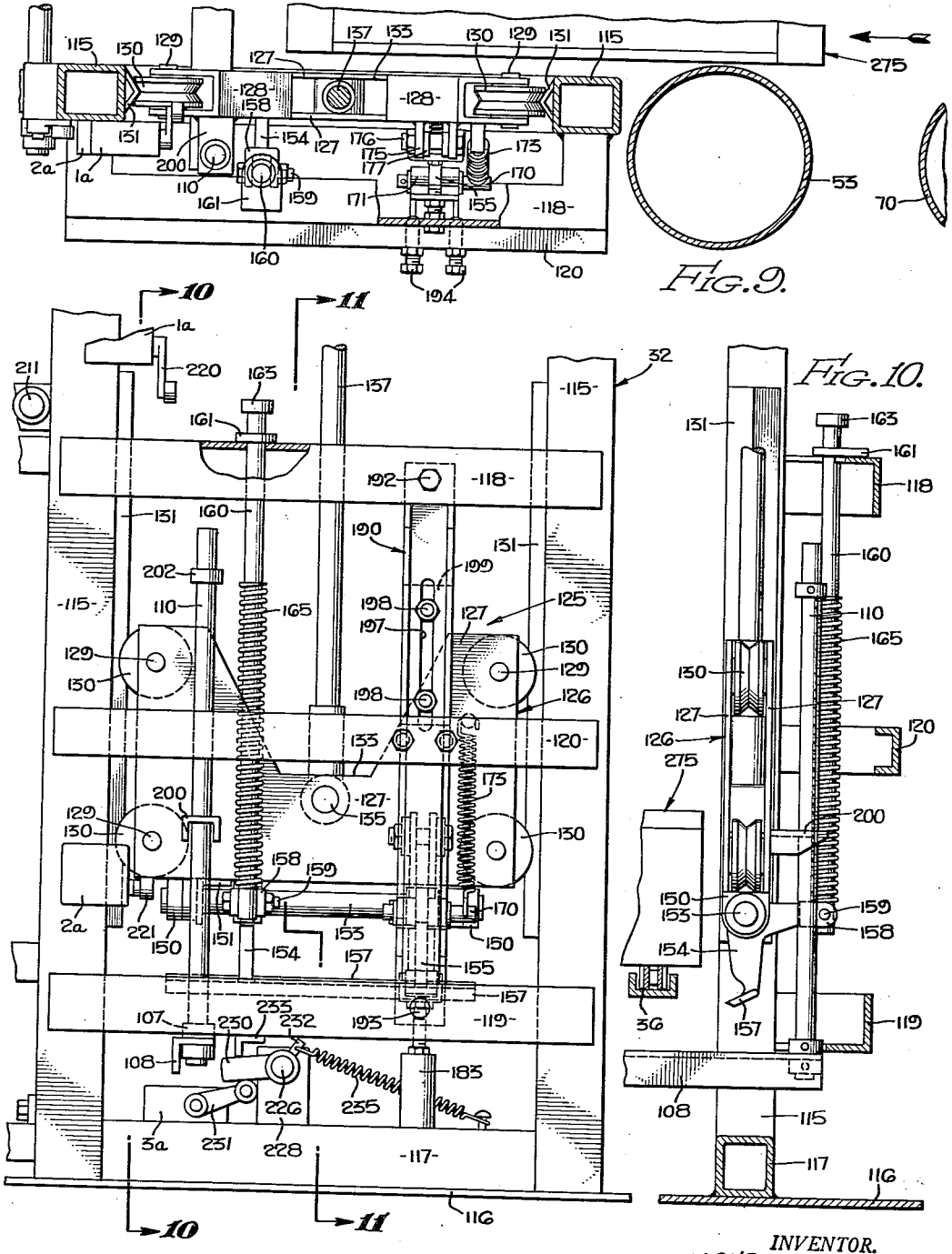

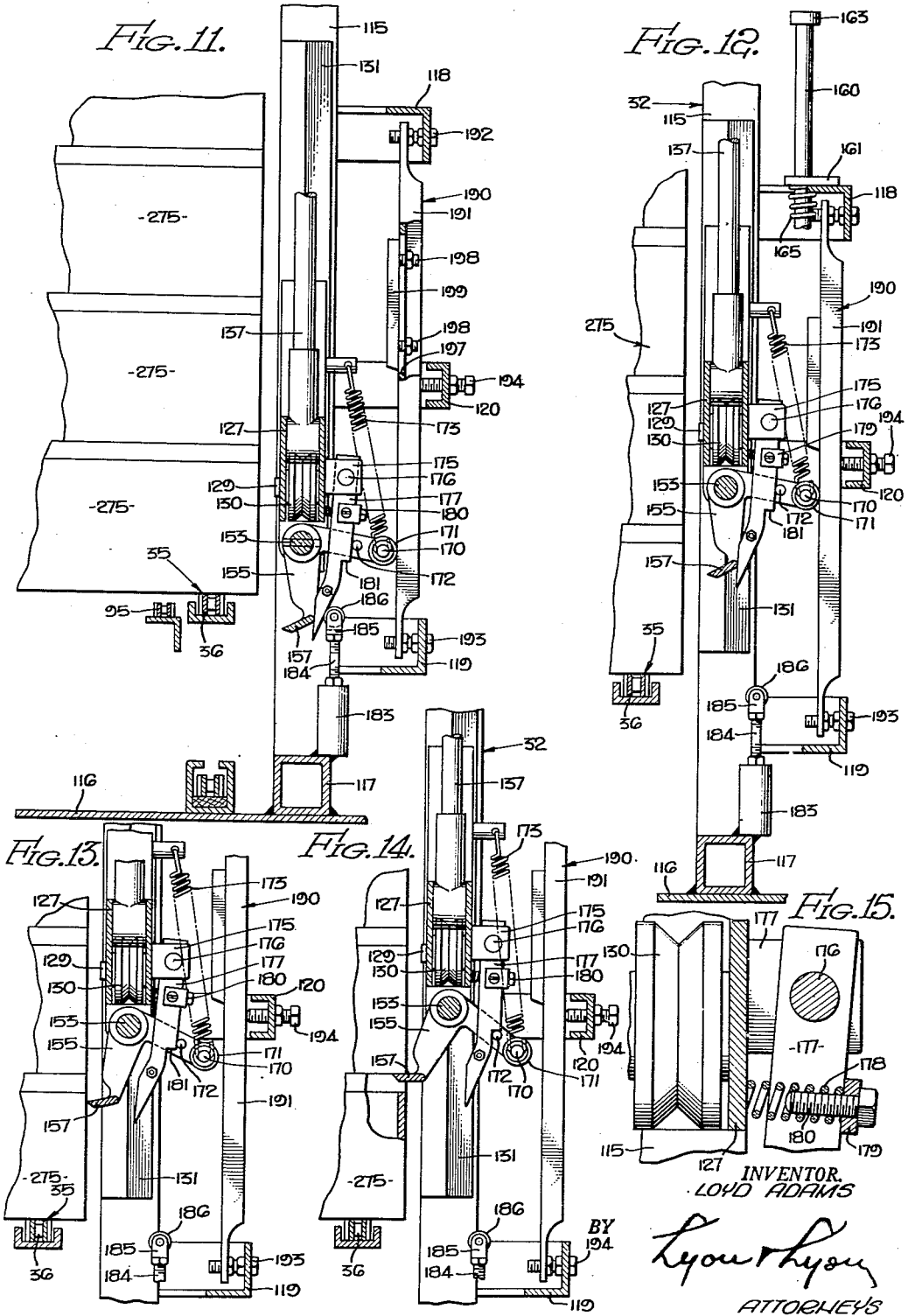

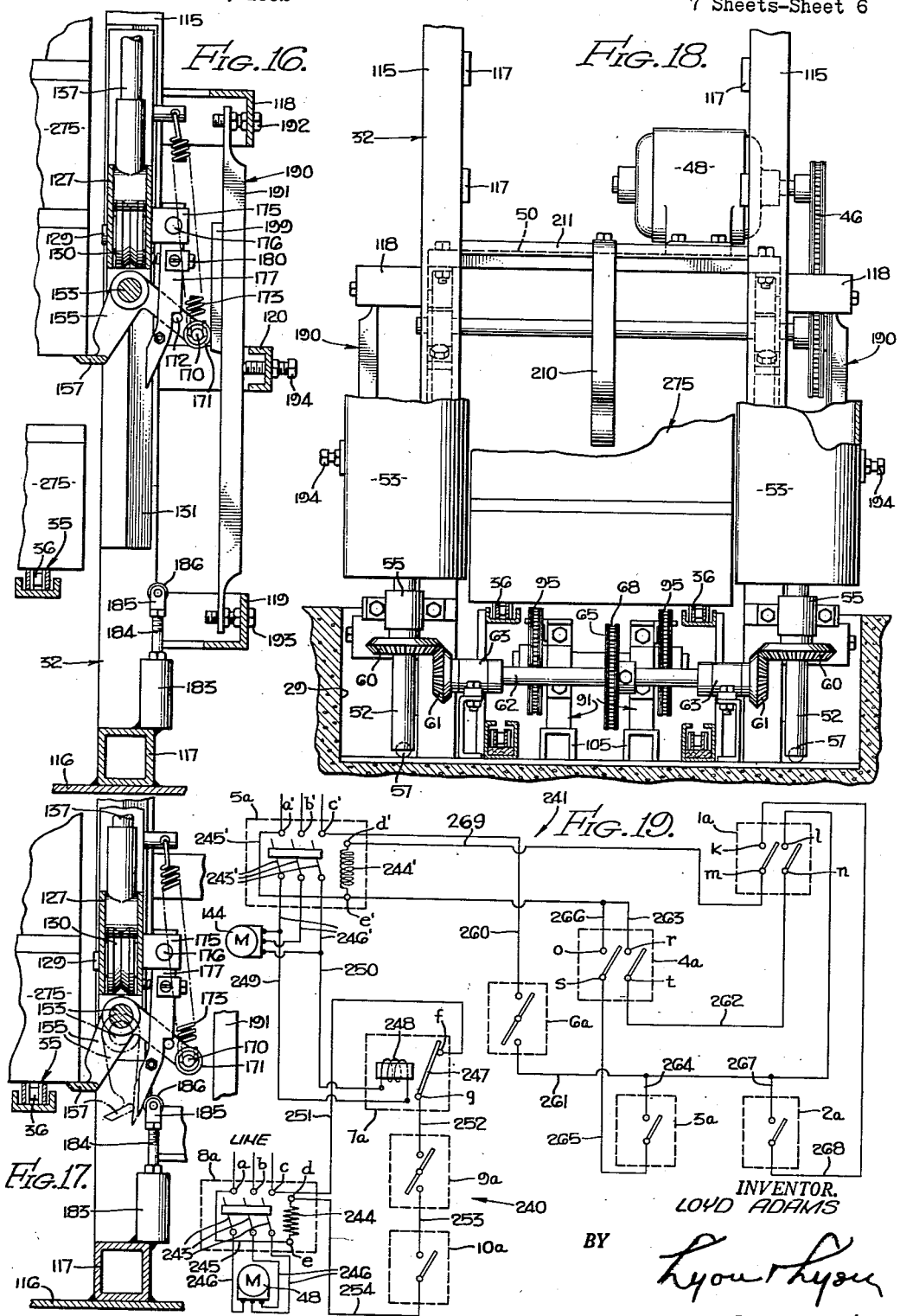

Nov. 6, 1956  L. ADAMS  2,769,570
BOX UNSTACKER
Filed June 13, 1952  7 Sheets-Sheet 7
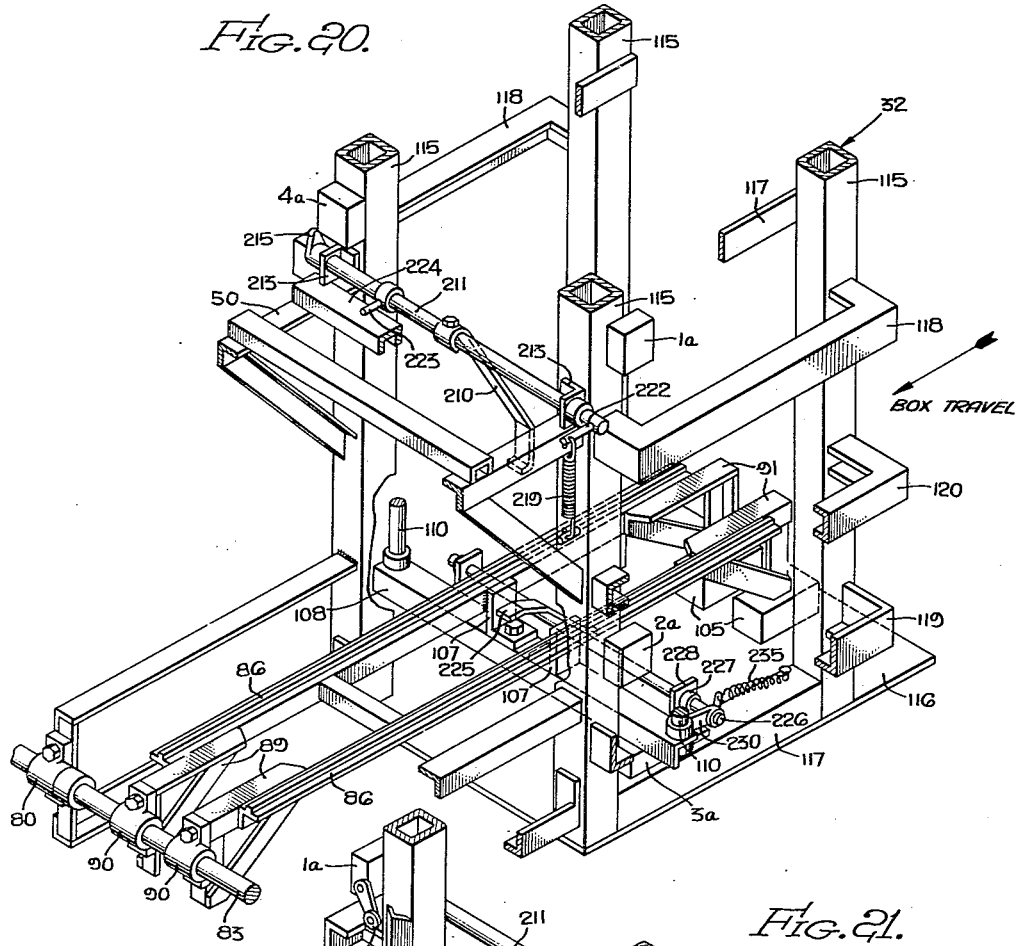
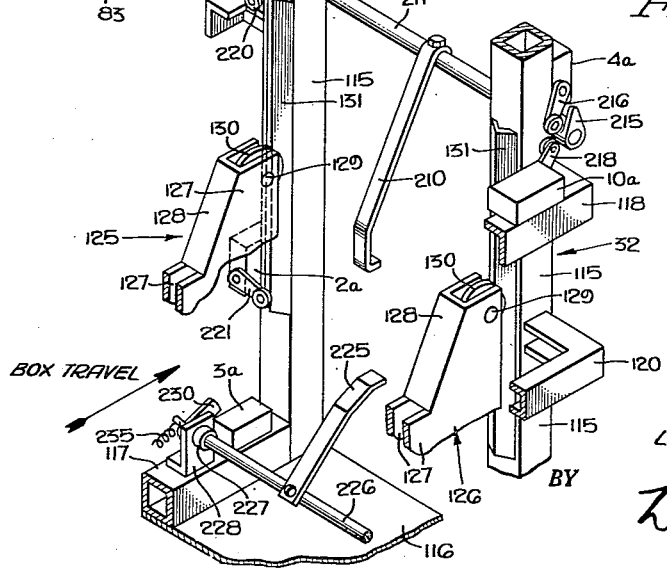
INVENTOR.
LOYD ADAMS
BY
Lyon & Lyon
ATTORNEYS

United States Patent Office 2,769,570
Patented Nov. 6, 1956

2,769,570

BOX UNSTACKER

Loyd Adams, Maywood, Calif., assignor to Calavo Growers of California, Los Angeles, Calif., a corporation of California Application June 13, 1952, Serial No. 293,361

3 Claims. (Cl. 221—225)

This invention relates to machines for handling receptacles and has particular reference to a machine for unstacking stacks of boxes, crates and the like. Although useful in other industries, the present invention is shown and described in relation to the avocado industry.

In this industry, avocados are brought from the groves to the packing houses in field boxes, the latter being stored in stacks, for convenience in storage and handling, until it is desired to run the fruit contained in these boxes through the process of cleaning, grading, packing and otherwise preparing the fruit for market. Accordingly, one of the principal objects of this invention is to provide a machine for automatically unstacking the stacks of boxes and delivering the individual boxes to the desired handling station.

Fruits such as avocados are extremely fragile and susceptible to injurious bruising if handled roughly. Another object of this invention is, then, to provide a box unstacking machine which is designed for rapid, yet careful and gentle handling of the boxes and their contents.

Another object of this invention is to provide a box unstacking machine which is arranged to receive vertical stacks of boxes and to deliver a continuous stream of single boxes at the same level as the incoming stacks.

Another object of this invention is to provide a novel box unstacking machine in which the boxes in a stack are removed one by one from the bottom of the stack without dropping or bumping the boxes in any manner.

Another object of this invention is to provide a novel conveyor assembly in a box unstacking machine wherein individual boxes are transferred from one conveyor to another without jarring or bumping of the boxes.

Other objects and advantages of the invention it is believed will be readily apparent from the following detailed description of a preferred embodiment thereof when read in connection with the accompanying drawings.

In the drawings,

Figure 2 is a sectional view taken substantially on the line 2—2 of Figure 6.

Figure 3 is a view similar to Figure 2, but on a reduced scale, illustrating a stack of boxes in position for unstacking.

Figure 4 is a view similar to Figure 3 and illustrating the receiving conveyor in position for the removal of the lowermost box in the stack.

Figure 5 is a sectional view taken substantially on the line 5—5 of Figure 2.

Figure 6 is a sectional view taken substantially on the line 6—6 of Figure 2.

Figure 6a is an extension of the right end of Figure 6.

Figure 7 is a perspective view illustrating the general type of field box operated on by the unstacking machine of this invention.

Figure 8 is a side elevation of a portion of the machine illustrating the unstacker mechanism.

Figure 9 is a horizontal section taken substantially on the line 9—9 of Figure 1, illustrating only one side of the machine.

Figure 10 is a vertical section taken substantially on the line 10—10 of Figure 8.

Figure 11 is a vertical section taken substantially on the line 11—11 of Figure 8.

Figures 12, 13, 14, 16 and 17 are views similar to Figure 11 and illustrating the sequential positions of the parts of the unstacker assembly during the unstacking cycle.

Figure 15 is a detail view similar to Figure 11 and illustrating in detail the upper portion of the latch arm and associated parts.

Figure 18 is an end view taken substantially on the line 18—18 of Figure 1.

Figure 19 is a wiring diagram illustrating the electrical system of the device.

Figures 20 and 21 are perspective views of a portion of the frame and showing the position of the electrical switches and actuators therefor.

Figure 1:
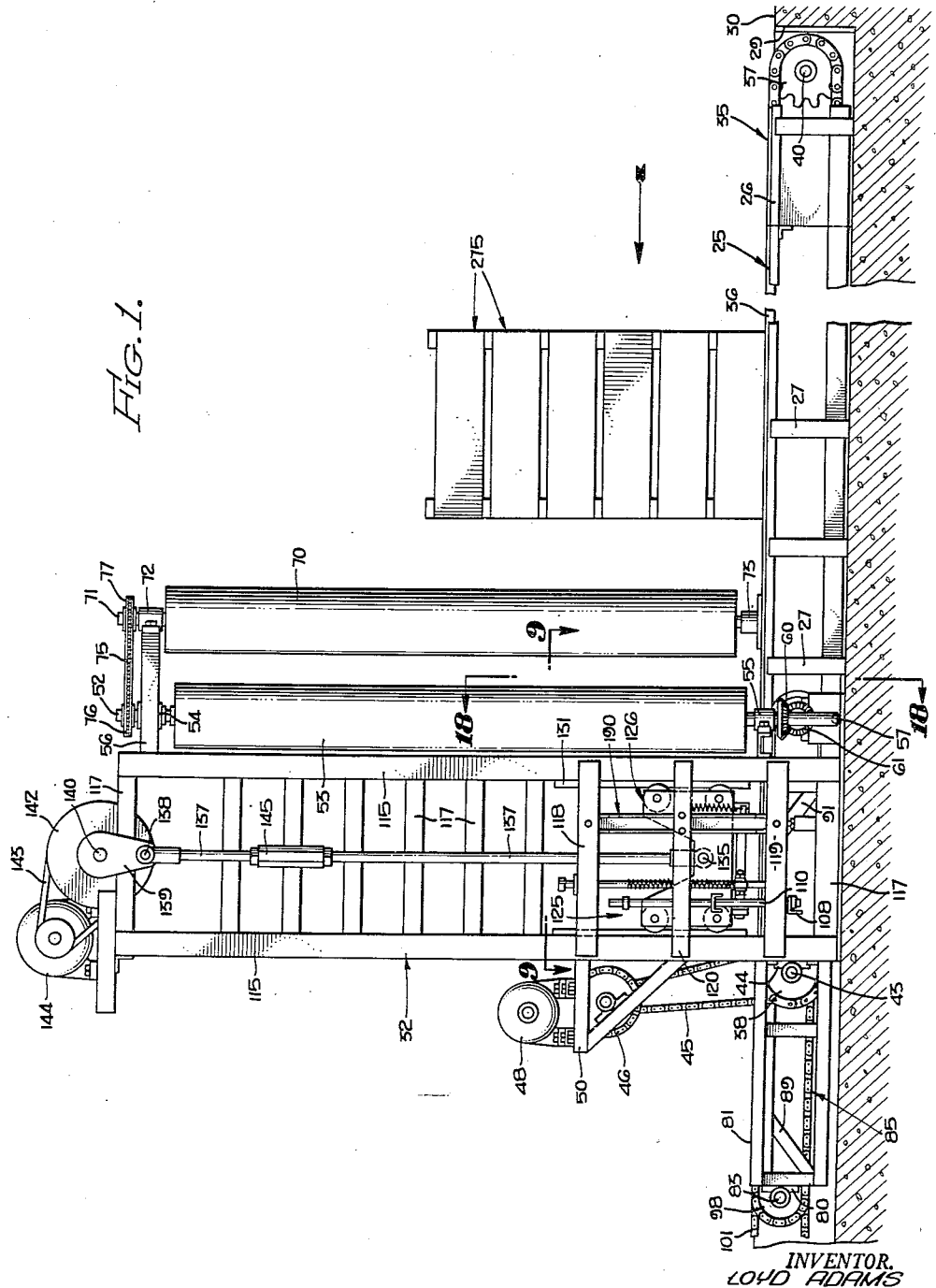
Figure 1 is a side elevation illustrating the box unstacking machine.

Referring now to the drawings, the machine which embodies the invention includes a main frame generally indicated 25 comprising longitudinal beams 26, vertical members 27 and horizontal bracing 28, the frame preferably being bolted to the walls of a well 29 formed in concrete flooring 30. Intermediate the ends of the main frame 25 is mounted the vertical frame 32 upon which is supported the stack pick-up and unstacking assembly which will be described in detail below.

A stack feeder conveyor generally indicated 35 extends from one end of the main frame 25 through the vertical frame 32 and comprises a pair of endless chains 36 with the upper runs thereof being slightly above floor level. Each chain extends between one of a pair of idler sprockets 37 at the delivery end of the main frame and one of a pair of driven sprockets 38 adjacent the vertical frame 32. The sprockets 37 are carried on a cross shaft 40 which is journaled in suitable bearing blocks 41 bolted to the frame, and the sprockets 38 are carried on a driven shaft 43 journaled in bearing blocks 44, likewise bolted to the frame. The shaft 43 carries a sprocket 47 driven, through suitable chain transmissions 45 and 46, by the feeder conveyor motor 48 which is bolted to a platform 50 carried on the vertical frame 32.

The shafts 52 of a pair of vertical stack aligner drums 53 are journaled in suitable upper and lower bearings 54 and 55 respectively, mounted on each side of the frame 25, each of the upper bearings 54 being carried on a horizontal arm 56 extending outwardly from the frame 32. The lower end of each shaft is dished to receive a ball thrust bearing 57. Means are provided for driving the drums in opposite directions with the inner surfaces thereof moving at the same speed and in the same direction as the conveyor 35 and the stacks of boxes supported thereon. As shown best in Figures 1, 6 and 18, each of the shafts 52 is provided at the lower end thereof with a bevel gear 60 which is engaged with one of a pair of bevel gears 61 carried on the outer ends of a cross-shaft 62. The shaft 62 is journaled in bearing blocks 63 carried on the frame 25 and is provided with a sprocket 65 centrally thereof. A central sprocket 67 is carried on the driven shaft 43, and extending between the sprockets 65 and 67 is an endless chain 68 for driving the sprocket 65, shaft 62 and, in turn, the drums 53.

A second pair of drums 70 is provided having shafts 71 journaled in upper and lower bearings 72 and 73 respectively, mounted on each side of the frame 25, the upper bearing 72 being carried on the horizontal arm 56. Each of the drums 70 is driven in the same direction and at the same speed as its adjacent drum 53 by means of an endless chain 75 extending between a sprocket 76 on the appropriate shaft 52 and a sprocket 77 on the appropriate shaft 71.

Referring now in particular to Figures 2 and 6, journaled in suitable bearing blocks 80 carried on the discharge end 81 of the main frame 25 is a cross-shaft 83. A discharge conveyor assembly generally indicated 85 is pivotally connected at the delivery end thereof to the cross-shaft 83. The assembly 85 includes a generally horizontal frame including longitudinal beams 86 and horizontal bracing 88. One of a pair of bracket members 89 depends from each of the longitudinal beams 86, and secured to each of said bracket members is a bearing block 90 through which extends the cross-shaft 83. A pair of similar bracket members 91 is provided at the other end of the frame and carries bearing blocks 92 in which is journaled a cross-shaft 93. The discharge conveyor proper comprises a pair of endless chains 95, each chain extending between one of a pair of idler sprockets 97 carried on the cross-shaft 93 and one of a pair of driven sprockets 98 carried on the cross-shaft 83. Each of the beams 86 is provided with a longitudinal rib 100 providing a track for the conveyor chains 95 (see Figure 5). The cross-shaft 83 is driven by a power source (not shown) through the chain transmission 101, and operates at the same speed as the feeder conveyor 35.

As will be noted from an inspection of the drawings, the discharge conveyor assembly extends into the area of the vertical frame 32 and, being narrower than the feeder conveyor 35, is nested between the chains 36 thereof. From the above description it will be understood that the discharge conveyor assembly is adapted to be bodily pivoted about the cross-shaft 83 from the position shown in Figure 3 to the position shown in Figure 4. The assembly is maintained in the inoperative position shown in Figure 3 by means of a pair of blocks 105 upon each of which rests the lower end of one of the brackets 91.

Means are provided for raising the receiving end of the assembly 85 to the position shown in Figure 1, and as shown best in Figure 20, these means may include the pair of brackets 107, one secured to each of the beams 86. Bolted to these brackets is a cross-beam 108 which carries at both outer ends thereof one of a pair of lift rods 110. These rods are operably connected to and actuated by the unstacker assembly in the manner described hereinafter.

The vertical frame 32 includes four vertical corner posts 115 extending upwardly from a bottom plate 116 and a plurality of horizontal cross-beams 117. On both sides of the frame are provided upper and lower C-shaped angle members 118 and 119 and an intermediate C-shaped channel member 120. These members 118, 119 and 120 extend outwardly from the sides of the frame 32 as shown best in Figure 20, for a purpose to be described below.

The unstacker assembly generally indicated 125 comprises two identical units, one on each side of the vertical frame 32, and hence for purposes of clarity of description, only one of these units will be described. Each of these units includes a carriage 126 which comprises a pair of parallel vertical plates 127 maintained in spaced relationship by wall portions 128 (see Figure 9) and by axle members 129 at each corner thereof. Journaled on each of the axles is a double-flanged wheel or roller 130. Appropriate pairs of rollers 130 are engaged with a track 131 on each of the vertical posts 115, the tracks being formed of lengths of angle-iron. The plates 127 are each provided with a notched portion 133 extending downwardly from the upper ends thereof, and extending between the plates below the notched portion is a pivot pin 135. An actuator rod 137 is pivoted at the lower end thereof to the pin 135 and at the upper end to a pin 138 carried on a crank arm 139. The crank arm is keyed to a cross-shaft 140 journaled in suitable bearings (not shown) on the frame 32, the shaft also having a pulley 142 driven by the belt 143 from the unstacker motor 144. The rod 137 is provided with a turnbuckle member 145 for adjustment purposes. From the above description it will be understood that for each revolution of the shaft 140 the two carriages 126 are moved through one complete cycle, i. e., from the bottom position shown in Figures 2 and 8 to the raised position of Figure 16 and thence back to the position of Figures 2 and 8.

Journaled in suitable bearings 150, supported from the plates 127 by means of angle brackets 151, is a rock shaft 153. A pair of similar L-shaped arms 154 and 155 are secured to the rock shaft for rotation therewith and supported on the lower leg of these arms is the box pick-up finger or bar 157. The arms differ in the construction of the other or upper legs thereof. The upper leg of the arm 154 is provided with a clevis 158 having a pin 159 which forms a pivotal connection with the lower end of a rod 160 (see especially Figure 10). The rod 160 extends upwardly through an oversize aperture in a plate 161 secured to the angle member 118, and is provided at the upper end thereof with a stop collar 163. A helical spring 165 encircles a portion of the rod 160, extending upwardly from the clevis 158.

The upper leg of the arm 155 is provided at the outer end thereof with a pin 170 upon which is journaled a roller or follower member 171, and extending from both sides of the upper leg of the arm is a second pin 172. A helical spring 173 is connected at one end to the outer plate 127 and at the other end to the pin 170, the spring tending to urge the arm 155 in a counterclockwise direction, as seen in Figures 11-17.

Welded to the outer plate 127 is a pair of bracket members 175 having a pin 176 extending therebetween. A bifurcated latch arm 177 is pivoted to the pin 176 and straddles the upper leg of the arm 155. The lower end of the arm is urged in a counterclockwise direction, as seen in Figures 11-17, by means of the helical spring 178 which contacts the plate 127 at one end and a cross bar 179 on the arm 177 at the other end (see Figure 15). In order to prevent disassembly, the spring 178 is caused to encompass a stud 180 extending inwardly through the bar 179. The outer face of the arm 177 has an upper straight portion terminating in a shoulder 181 and therebelow the outer face curves downwardly and inwardly.

Mounted on each of the two lowermost horizontal beams 117 and directly below the latch arms 177 is an internally threaded member 183 in which is secured a threaded rod 184. Carried at the upper end of the rod is a fork member 185 in which is rotatably carried a roller 186.

A track member 190 is provided for the roller 171 and comprises a channel 191 secured at the top and bottom thereof to angle members 118 and 119 respectively, by means of lock nut members 192 and 193. A pair of studs 194 extends inwardly through the channel member 120 and contacts the flanges of the channel 191, providing means for proper alignment of the channel. The channel 191 is provided with a longitudinal slot 197 in the upper portion of the web thereof, and secured to the channel by means of a pair of bolts 198 extending through the slot is a stationary cam member 199. The slot 197 provides for vertical adjustment of the cam member.

Each of the lift rods 110 referred to above extends upwardly through an aperture in a channel guide member 200 extending outwardly from the appropriate carriage outer plate 127. The lift rods are each provided at the upper ends thereof with a stop collar 202.

The operation of the machine is controlled by the electrical apparatus indicated by the wiring diagram illustrated in Figure 19. This apparatus includes certain switches and actuators illustrated best in Figures 20 and 21 and shown also in certain of the other figures referred to below. Means are provided for automatically stopping the feeder conveyor 35 upon delivery, in position for unstacking, of a stack of boxes to the unstacker frame 32. As shown in the drawings, these means may include a switch actuator arm 210 rigidly carried on a cross-shaft 211. A bracket member 213 is mounted on each of the two rearward corner posts 115, and these bracket members are each provided with a suitable bearing surface in which is journaled the cross-shaft 211. Carried on one of the ends of cross-shaft 211 is a cam 215 for the actuation of the crank arm 216 of the two pole switch 4a which is normally open. The switch 4a is mounted on the appropriate vertical post 115. Mounted on the member 118 is a single pole normally closed switch 10a having a crank arm 218 which is also adapted to be actuated by the cam 215. The actuator arm 210 is biased in a counterclockwise direction as seen in Figure 20, by means of a helical spring 219 connected at one end to one of the posts 115 and at the other end to a pin 222 extending radially outwardly from the cross-shaft 211. An arm 223 is carried on the shaft 211 and contacts the horizontal angle member 224 to limit the swinging movement of the actuator arm 210.

Mounted on the vertical post 115 opposite from the post 115 on which the switch 4a is mounted, is a two pole normally closed switch 1a having a crank arm 220 adapted to be actuated by the carriage 126 when it reaches the raised position. A single pole normally closed switch 2a having a crank arm 221 is mounted on the same vertical post 115 as is the switch 1a and is adapted to be actuated by the carriage 126 when it reaches the bottom position.

A switch actuator arm 225 is rigidly carried on a cross-shaft 226 journaled in suitable bearings 227 carried by the bracket members 228, one mounted on each of the two lowermost horizontal beams 117. Carried on each end of the cross-shaft 226 is a cam 230, one of which actuates the crank arm 231 of the single pole switch 3a, which is normally closed. As shown best in Figures 8, 20 and 21, the actuator arm 225 is biased upwardly by means of a helical spring 235 connected at one end to one of the beams 117 and at the other end to a pin 232 extending radially outwardly from the cross-shaft 226. An angle iron stop member 233 is provided on the underside of each of the members 119, and each of these stop members is adapted to be contacted by one of the cams 230 to limit upward movement of the actuator arm 225.

Referring now to Figure 19, the electrical apparatus includes a control circuit 240 for the feeder conveyor motor 48 and a control circuit 241 for the unstacker motor 144. The circuit 240 is provided for the purpose of starting or stopping the conveyor motor 48 to cause the feeder conveyor to supply stacks of boxes to the pick-up mechanism as needed and in timed relation with the operation of the pick-up mechanism. The circuit 241 operates to stop and start the pick-up motor 144 to cause the unstacker assembly 125 to go through its sequence of operation.

The circuit 240 includes a three pole magnetic switch 8a having contact points a, b and c, supplied with three phase current through three lead wires from the line. The three blades 243 of the switch 8a are brought into or out of engagement with the contact points by a magnetic coil 244 having terminals d and e. Connecting the contact a with the terminal e of the coil 244 is a wire 245, and extending from the blades 243 to the motor 48 are three wires 246.

The magnetic switch 8a is controlled by a normally closed relay switch 7a having contacts f and g, blade 247 and a magnetic coil 248. The coil is energized through wires 249 and 250 leading from the switch 5a, as will be more fully described below. A wire 251 leads from the terminal c to the contact f, and a wire 252 leads from the contact g to a manually operated single pole toggle switch 9a. The switch 10a referred to above is positioned between the switch 9a and the switch 8a and completes the circuit therebetween by means of a wire 253 and a wire 254 which terminates at the terminal d.

The circuit 241 includes the three pole magnetic switch 5a having contact points a', b' and c', supplied with three phase current through three lead wires from the line. The three blades 243' of the switch 5a are brought into and out of engagement with the contact points by a magnetic coil 244' having terminals d' and e'. Connecting the contact a' with the terminal e' of the coil 244' is a wire 245', and extending from the three blades 243' to the motor 144 are three wires 246'.

A wire 260 leads from the contact c' to a manually operated single pole toggle switch 6a and leading therefrom to the switch 1a is a wire 261, the switch 1a having contacts k, l, m and n, and the wire 261 being connected to the contact l. The switch 4a is provided with contacts o, r, s and t, and a wire 262 extends from the contact n of the switch 1a to the contact t of the switch 4a, and a wire 263 connects the contact r to the terminal e' of the coil 244'. A wire 264 leads from the wire 261 to the switch 3a, and a wire 265 connects switch 3a with the contact s of the switch 4a. The contact o of the switch 4a is connected to the wire 263 by means of a wire 266. A wire 267 leads from the wire 261 to the switch 2a, and a wire 268 connects the switch 2a to the contact k of the switch 1a. A wire 269 leads from the contact m of the switch 1a to the terminal d' of the coil 244 to complete the circuit.

The circuits 240 and 241 are interconnected by means of the previously mentioned wires 249 and 250 which lead respectively from two of the three wires 246' to the terminals of the relay coil 248.

It will be understood that the machine of this invention is designed to operate upon field boxes of the type illustrated in Figure 7 and generally indicated 275. These conventional boxes have a flat bottom 276, side walls 277 and end walls 278. The top is open and either end thereof is provided with one of a pair of cross-members 279 which provide structural reinforcement and which also act as spacers to maintain stacked boxes in spaced relation.

In operation of the machine, a stack or several stacks of boxes 275 are placed on the feeder conveyor 35. It will be noted that the conveyor is only slightly above the level of the floor in order to facilitate the initial loading operation. The manually operated switches 6a and 9a are then closed, thus energizing the feeder conveyor motor 48. From the above description of Figure 19, it will be understood that at this point the various switches which control the operation of the unstacker motor 144 are open so that the unstacker assembly is inoperative. A third manually operated switch (not shown) is also now closed to operate the discharge conveyor chains 95. It is to be understood that these chains are continuously driven through the transmission 101 during the operation of the machine.

The first stack of boxes is progressed forwardly by the conveyor 35 through the space between the pairs of aligner drums 53 and 70 which, as indicated above, are directly driven from the conveyor 35 so that the inner faces of the drums travel at the same rate of speed as the stacks conveyed therebetween. The spacing between the drums of each pair is substantially equal to the length of the boxes 275 and hence the boxes in the stacks are moved into proper vertical alignment by contacting the drums as they pass therebetween. It has been found that at least two pairs of drums are necessary to assure proper alignment under substantially all conditions.

After passing through the aligner drums, the stack progresses into the vertical frame 32 (see Figure 3), whereupon the lowermost box 275 contacts the switch actuator arm 225 and causes it to be depressed, thus rotating the shaft 226 and actuating the crank arm 231 by means of the cam 230 to open the switch 3a. As will be understood from an inspection of Figure 19 and a consideration of the following description, this has no immediate effect upon the control circuit 241. However, simultaneously with the actuation of the switch 3a, the stack of boxes contacts the switch actuator arm 210, moving it to the left, as seen in Figure 3, and as indicated in Figures 20 and 21, causing the cross-shaft 211 to be rotated and the cam 215 to actuate first the crank arm 216 and then the crank arm 218. This in turn closes the switch 4a and then opens the switch 10a, substantially simultaneously energizing the unstacker motor 144 and stopping the feeder conveyor motor 48.

It will be understood that at this point the carriages 126 of the unstacker assembly 125 are in the bottom position shown in Figures 2, 8, 10 and 11. The shaft 140 is caused to be turned by the motor 144 and hence the carriages 126 are first moved upwardly to the position shown in Figure 12. In describing the operation of the unstacker assembly the operation of only one of the two identical units will be set forth in detail for purposes of clarity of description. As the carriage moves upwardly, the lower end thereof releases the crank arm 219, opening the switch 2a. It will be noted that during the period of travel from the bottom position to the position of Figure 12, the box pick-up bar 157 is in the retracted or disengaged position. At about the point in the travel of the carriage 126 and its associated parts which is indicated in Figure 12, the upper end of the spring 165 comes into contact with the underside of the plate 161. Between the positions of Figures 12 and 13, the spring has compressed sufficiently to transmit thrust forces to the arm 154 so that the bar 157 is pivoted inwardly toward the pick-up position and contacts the side wall 277 of the lower-most box in the stack.

As indicated in Figure 13, the thrust transmitted via the spring 165 is sufficient to overcome the compression of the spring 173 to permit pivotal movement of the arm 155 as well as the arm 154. This causes relative movement between the upper leg of the arm 155 and the latch arm 177 so that the pin 172 is moved downwardly along the upper outer face of the arm 177. As the carriage 126 and its associated parts move upwardly to the position of Figure 14, the pick-up bar 157, which is biased into contact with the box side walls by means of the spring 165, is moved into the open space between the lowermost box and the next adjacent box, and contacts the underside of the latter box. At this point, the pin 172 falls into latching position under the shoulder 181 of the latch arm 177. The pick-up bars 157 are each now in position to lift the upper boxes in the stack off the lowermost box.

Continued upward travel of the carriage 126 and its associated parts brings them to the position illustrated in Figure 16 wherein the upper boxes are entirely removed from contact with the lowermost box. At this point the roller 171 contacts the stationary cam member 199, thus providing a positive locking arrangement to prevent downward pivotal movement of the pick-up bar 157.

At this stage in the cycle of operation, the channel guide member 200 on the carriage has been carried upwardly a distance sufficient to contact the stop collar 202 on the lift rods 110. Further upward movement to the fully raised position causes the lift rods 110 to lift the delivery end of the discharge conveyor 85, thus pivoting the conveyor from the position shown in Figure 3 to the position shown in Figure 4. It will be recalled that the chains of the conveyor are continuously in operation, so that on reaching the position of Figure 4, the full weight of the lowermost box is transferred from the stationary chains of the feeder conveyor 35 to the moving chains of the discharge conveyor 85, and the box is moved out from under the raised stack.

Simultaneously with the raising of the discharge conveyor and as the carriage reaches the fully raised position referred to above, the crank arm 139 is on top dead center and the upper end of the carriage contacts the crank arm 220, opening the switch 1a and thus (since the switch 2a is also open) stopping the unstacker motor 144. The stack of boxes is thus held stationary in the raised position to permit the discharge conveyor to remove the lowermost box. As that box is removed, the switch actuator arm 225 is free to pivot to its normally raised position wherein the switch 3a is closed. This starts the unstacker motor 144, and the carriages 126 start downwardly, moving out of contact with the crank arm 220. The switch 1a is thus closed and in condition to be opened during the next cycle.

The carriages and their associated parts continue downwardly, lowering the stack, until they reach the bottom position illustrated in Figure 17. Immediately prior to reaching this position, the lower curved face of the latch arm 177 contacts the roller 186 and cams thereagainst to move from the solid line to the phantom line position. The latch arm 177 is thus caused to pivot inwardly against the action of the spring 178, moving the pin 172 out from under the shoulder 181 and thereby unlatching the arm 155. At this point, the discharge conveyor has pivoted to the horizontal position and the stack rests on the conveyor chains 36. Also, the spring 165 has moved out of contact with the plate 161 so that the pick-up bar 157 is free to be moved by the spring 173 to the initial retracted position.

As the stack is deposited on the conveyor chains 36, the carriage contacts the crank arm 220 to open the switch 2a, and the now lowermost box contacts the switch actuator arm 225 and causes it to be depressed, opening the switch 3a. Neither of these operations has any effect upon the operation of the unstacker motor 144 at this point, since the switch 1a is closed and the switch 4a is still closed by virtue of the fact that the stack is still in contact with the switch actuator arm 210. Accordingly, the motor 144 continues to run, and the crank arm 139 being on bottom dead center, the unstacker assembly is raised and the cycle of operation described above is repeated.

This cycle is repeated until the last box is lowered toward the conveyor chains 36. As the box moves toward this position, the switch actuator arm 210 is freed to swing outwardly, opening the switches 4a and closing the switch 10a. This does not stop the unstacker motor since switches 2a and 1a are still closed (as well as 6a), nor does the closing of the switch 10a start the feeder conveyor since the relay switch 7a is open so long as the unstacker motor 144 is energized. As the last box is deposited upon the conveyor chains 36, the lower end of the carriage 126 contacts the crank arm 220, opening the switch 2a. The unstacker motor 144 is thus stopped and simultaneously the relay switch 7a is de-energized to be returned to its normally closed position, whereupon the motor 48 is energized to start the feeder conveyor 35. The last box is moved horizontally by the feeder conveyor and is thereby transferred to the discharge conveyor 85. At the same time, a new stack is delivered to the vertical frame 32, and the entire cycle is repeated.

From the above description it will be understood that an entirely automatic box unstacking machine has been provided wherein stacks of boxes are segregated into a continuous line of single boxes. The machine is arranged to deliver the single boxes at the same level as the incoming stacks and the operation of the machine inherently provides for rapid yet gentle handling of the boxes and their contents.

While I have shown and described a specific embodiment of my invention, I do not limit myself to the exact details of the construction set forth, and the invention embraces such changes, modifications and equivalents of the parts and their formation and arrangement as come within the purview of the appended claims.

I claim:

1. In a machine for handling boxes, the combination of a main frame; a vertical frame intermediate the ends of said main frame; a horizontal feeder conveyor supported on said main frame and adapted to deliver a stack of boxes to said vertical frame, said feeder conveyor including a pair of endless chains; an unstacker assembly carried on said vertical frame, said assembly including means for simultaneously lifting all but the lowermost of the boxes in a stack, said means including a pair of carriages vertically reciprocable in said frame, a bracket member on each of said carriages, said bracket member being provided with an aperture; a horizontal discharge conveyor having a receiving end and a delivery end and including a pair of spaced endless chains, the delivery end of said discharge conveyor being pivotally connected to said main frame and the receiving end thereof extending into nested relation between the endless chains of said feeder conveyor; and means operably connecting the receiving end of said discharge conveyor with said carriage for moving said receiving end upwardly with respect to said feeder conveyor and in timed relation with the operation of said unstacker assembly whereby the lowermost box is transferred from said feeder conveyor to said discharge conveyor, said last means including a pair of rods extending upwardly from each side of the receiving end of said discharge conveyor and through said apertured bracket members, the upper end of each rod being provided with stop means engageable by the upper surface of each of said bracket members.

2. In a machine for handling boxes, the combination of a frame, a feeder conveyor supported by said frame and adapted to convey a stack of boxes, said feeder conveyor including a pair of spaced endless members, an unstacker assembly intermediate the ends of said frame in a position to operate upon a stack of boxes on said feeder conveyor, said unstacker assembly including means for simultaneously lifting all but the lowermost of the boxes in a stack, said means including a vertically reciprocable carriage, a bracket member on said carriage, said bracket member being provided with an aperture, a discharge conveyor having a receiving end and a delivery end and including a pair of spaced endless members, the delivery end of said discharge conveyor being pivotally connected to said frame and the receiving end thereof extending into nested relation between the endless members of said feeder conveyor, and means operably connecting the receiving end of said discharge conveyor with said carriage for moving said receiving end in timed relation with the operation of said unstacker assembly whereby the lowermost box is transferred from said feeder conveyor to said discharge conveyor, said last means including a rod extending upwardly from the receiving end of said discharge conveyor and through said apertured bracket member, the upper end of said rod being provided with stop means engageable by the upper surface of said bracket member.

3. In a machine for handling boxes, the combination of a main frame; a vertical frame intermediate the ends of said main frame; a horizontal feeder conveyor supported on said main frame and adapted to deliver a stack of vertically spaced boxes to said vertical frame, said feeder conveyor including a pair of endless chains; a pair of carriages, one on each side of said vertical frame; a bracket member on each of said carriages, each of said bracket members being provided with an aperture; means for vertically reciprocating said carriages with respect to said vertical frame; a stack pickup bar operably connected to each of said carriages; means for resiliently urging said pickup bars inwardly against the lowermost box of the stack, thence into the space between the boxes, and thence into lifting position in contact with the bottom of the box next adjacent the lowermost box as the carriages are moved upwardly; means operable upon further upward movement of said carriages for locking said pickup bars in lifting position; a horizontal discharge conveyor having a receiving end and a delivery end and including a pair of spaced chains, the delivery end of said discharge conveyor being pivotally connected to said main frame and the receiving end thereof extending into nested relation between the endless chain of said feeder conveyor; and means for pivoting said discharge conveyor to move the receiving end thereof upwardly with respect to said feeder conveyor and in timed relation with the operation of said carriages to transfer the lowermost box from said feeder conveyor to said discharge conveyor, said last means including a pair of rods extending upwardly from each side of the receiving end of said discharge conveyor and through said apertured bracket members, the upper end of each rod being provided with stop means engageable by the upper surface of each of said bracket members.

References Cited in the file of this patent

UNITED STATES PATENTS

| | | |
|---|---|---|
| 548,056 | Hewitt | Oct. 15, 1895 |
| 939,177 | Stickney | Nov. 2, 1909 |
| 2,028,410 | Rapisarda | Jan. 21, 1936 |
| 2,629,503 | Neja | Feb. 24, 1953 |
| 2,687,813 | Verrinder et al. | Aug. 31, 1954 |